United States Patent [19]

Mickleson et al.

[11] 4,322,837
[45] Mar. 30, 1982

[54] DITHERED CENTER TRACKING SYSTEM

[75] Inventors: Lee Mickleson; Eric V. Olson, both of Long Beach, Calif.

[73] Assignee: Discovision Associates, Costa Mesa, Calif.

[21] Appl. No.: 70,062

[22] Filed: Aug. 27, 1979

[51] Int. Cl.³ .............................................. G11B 7/00
[52] U.S. Cl. ..................... 369/44; 250/202; 310/335; 350/6.2; 350/355
[58] Field of Search ............ 358/128.5; 179/100.1 G, 179/100.3 V; 250/201, 202, 203; 350/6.3, 6.2, 6.6, 6.5, 355; 310/363, 364, 335; 369/44

[56] References Cited

U.S. PATENT DOCUMENTS

| | | | |
|---|---|---|---|
| 3,498,693 | 3/1970 | Fein | 350/355 |
| 3,583,788 | 6/1971 | Lee | 350/355 |
| 3,894,792 | 7/1975 | Komatsubara | 350/355 |
| 3,932,700 | 1/1976 | Snopko | 179/100.3 V |
| 3,985,952 | 10/1976 | Adler | 179/100.3 V |
| 4,044,273 | 8/1977 | Konda | 310/335 |
| 4,090,779 | 5/1978 | McNaney | 350/355 |
| 4,232,201 | 11/1980 | Canino | 369/44 |

OTHER PUBLICATIONS

"The Electro Optic Effect in Uniaxial Crystals of Type $XH_2PO_4$", by Billings. Journal of Optical Society of America pp. 802-808. vol. 39, No. 10, Oct. 1945.

*Primary Examiner*—Raymond F. Cardillo, Jr.
*Assistant Examiner*—Alan Faber
*Attorney, Agent, or Firm*—Ronald J. Clark

[57] ABSTRACT

A servo control system for maintaining an information detection device, such as a light beam, centered on a moving information track, such as a spiral recording track on a video disc. The system of the invention includes an optical system, a piezoelectric dither element coated with a resistive material, a dither oscillator, circuitry for deriving an intermediate signal indicative of the effect of dither on the detected signal derived from the information track, phase comparison circuitry for deriving a known error signal from a comparison of the dither signal applied to the piezoelectric element and the actual dither modulation of the light beam retrieved from the information track.

5 Claims, 11 Drawing Figures

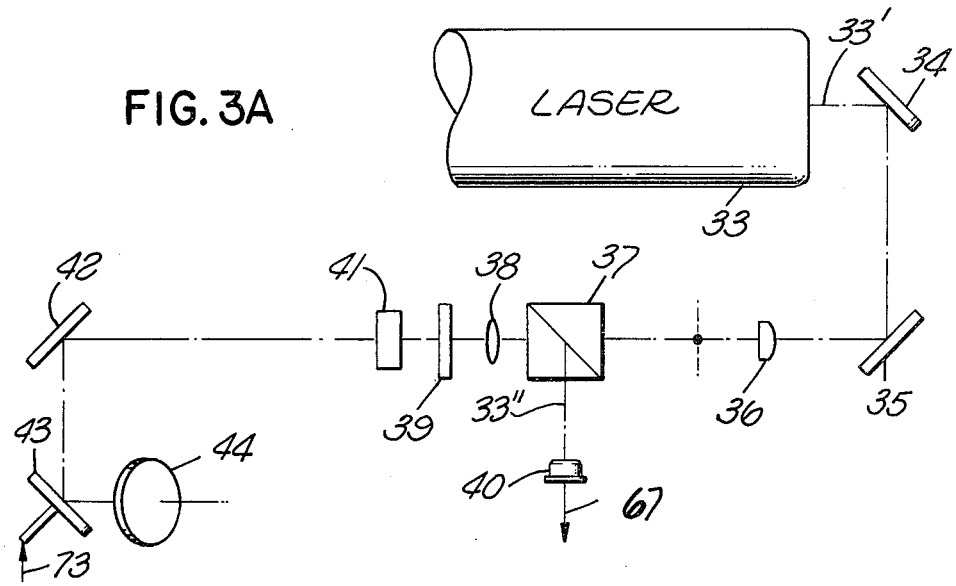
FIG. 3A
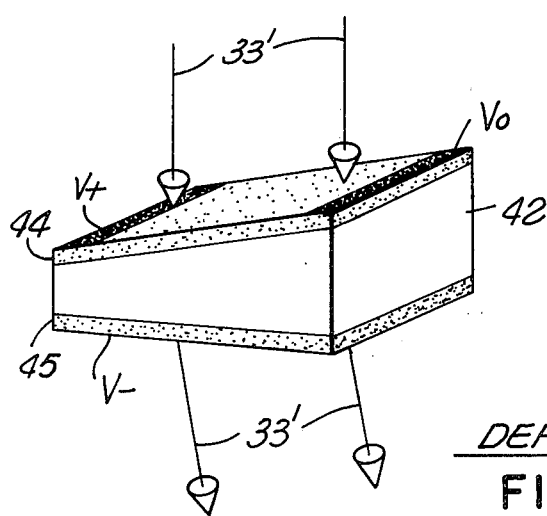
FIG. 3B
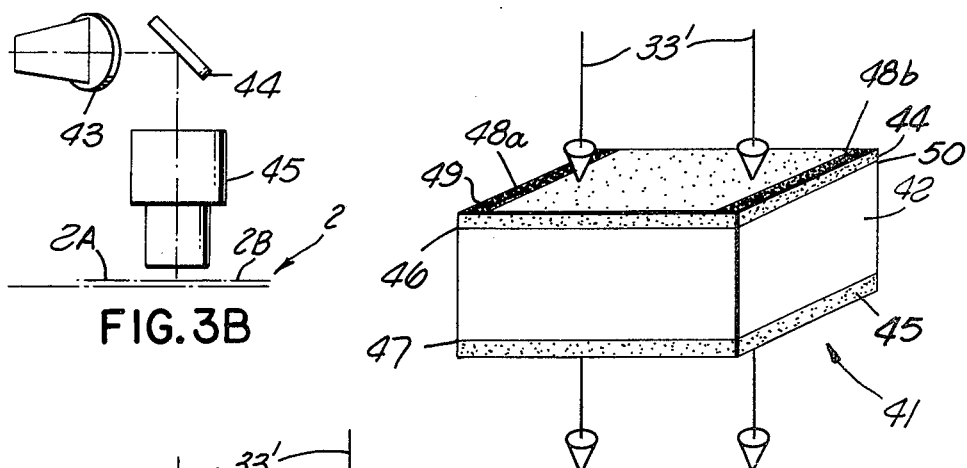
NORMAL
FIG. 4A
DEFORMED
FIG. 4B

UNDEFORMED

DEFORMED

DITHERED CENTER TRACKING SYSTEM

BACKGROUND OF THE INVENTION

1. Field of the Invention

This invention relates generally to systems for the reproduction of recorded information, such as video information recorded on a disc and, more particularly, to systems for centering a light beam on an information track on such a disc.

Video and other types of information can be stored on a disc as a succession of light reflective and light non-reflective regions along a spiral information track on the surface of a disc-shaped record carrier. In reproducing the video information a video disc player employs an optical system for directing a radiant reading beam, such as a laser beam, onto the information track, and for detecting a reflected beam indicative of the reflectivity of the disc surface scanned by the laser beam as the disc is rotated. In a disc player of the type with which the invention may be employed, the intensity of the reflected beam takes the form of a high frequency carrier signal which is frequency modulated by the composite video information.

In order to store a reasonably large amount of information on the disc, successive turns of the information track must be so closely spaced that even a slight degree of disc eccentricity would cause the beam to traverse a number of adjacent tracks on each revolution. Consequently, some means must be provided for applying transverse or radial corrections to the beam position, so that it substantially follows along the center of the information track.

2. Description of the Prior Art

In a commonly assigned copending application, Ser. No. 963,196, filed Nov. 24, 1978, entitled "Dithered Center Tracking System", filed in the name of Lawrence S. Canino U.S. Pat. No. 4,232,201 a dither tracking system is disclosed, wherein a constant frequency dither signal is applied to oscillate the reading beam, in a radial sense, as it moves along the information track. A bandpass filter is provided for deriving an intermediate signal indicative of the effect of the dither on the detected signal derived from the information track.

Switching circuitry derives an error signal from the intermediate signal and the polarity of the dither signal. The switching circuitry includes an inverter, and a switch for selecting either the intermediate signal or the inverted intermediate signal, in accordance with the polarity of the dither signal. Although this technique has proved satisfactory for many applications, it provides only one beam steering device for both application of the dither signal and tracking of the information track. This precipitates unwanted resonances at the lower tracking frequencies. At such high storage densities these unwanted resonances can cause an inaccurate error signal to be generated. Accordingly, there has been a need for an improved and more reliable technique of dither tracking which avoids the use of a single beam steering device. The present invention is directed principally to this end.

SUMMARY OF THE INVENTION

The present invention resides in an apparatus and a corresponding method for its use, for correcting the position of a detection means, such as a beam used to read information from a recording track, whereby the beam position is dithered perpendicularly to the track, and its center position closely follows the center of the track. Basically, as it applies to a videodisc player, the apparatus of the invention includes a piezoelectric member having resistive means, means for generating an oscillatory dither signal, means for phase comparison of a reflectivity signal derived from the reflected light beam and the oscillatory dither signal for providing a known error signal, and beam steering means responsive to this known error signal for manipulating the beam of radiation to accurately follow an information track.

In accordance with the best mode of the invention as presently contemplated, the piezoelectric dither member is responsive to the electric field applied to it, and the motion of the piezoelectric dither member is directly proportional to the intensity of the electric field directed to the member. Further, the resistive contacts provide a linear electrical field gradient across the surfaces of the piezoelectric dither member. This linear electrical field gradient developes an asymmetrical deformation of the piezoelectric dither member. This asymmetrical deformation is extremely effective in modulating a light beam with a dither signal of a high frequency and of a small amplitude.

In an alternate embodiment of the invention, the piezoelectric member with resistive contacts is replaced by a piezoelectric dither member with conductive contacts to which the oscillatory dither signal is applied.

It will be appreciated from the foregoing that the present invention represents a significant advance in the field of video reproduction systems, as well as in data retrieval systems in general. In particular, the invention provides a simplified and more reliable technique for insuring that the beam used to read information accurately follows the center of the information track on the disc. Other aspects and advantages of the present invention will become apparent from the following more detailed description, taken in conjunction with the accompanying drawings.

BRIEF DESCRIPTION OF THE DRAWINGS

FIG. 3A is a simplified diagrammatical view as seen from above, of an optical playback system for video disc recordings utilizing the principles of the present invention;

FIG. 3B shows a side view of a portion of the optical playback system shown in FIG. 3A;

FIG. 4A illustrates a detailed drawing of a piezoelectric member according to the present invention;

FIG. 4B is a detailed drawing of a piezoelectric member in its deformed state;

DESCRIPTION OF THE PREFERRED EMBODIMENT

Figure 1:
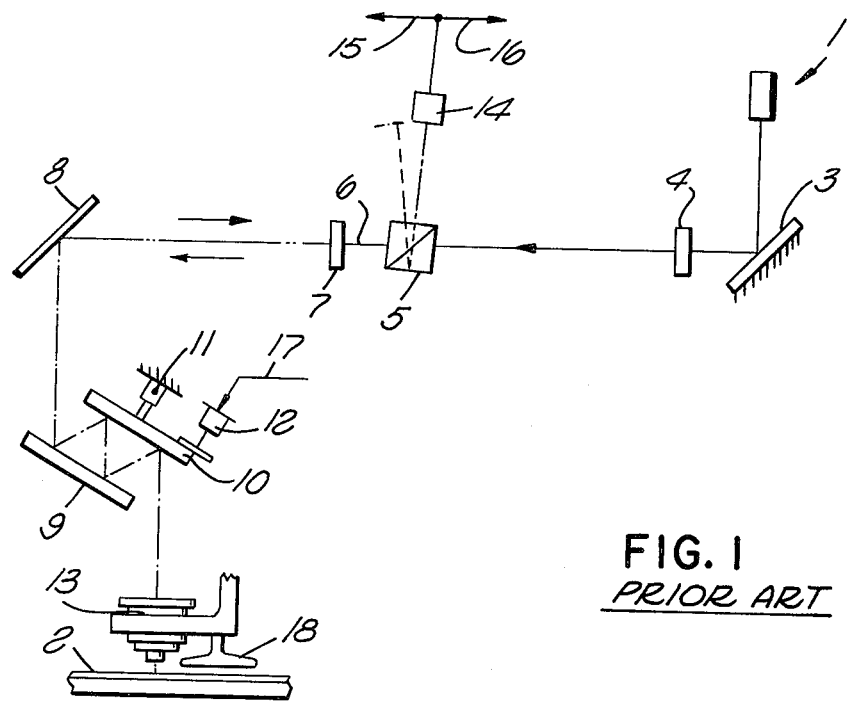
FIG. 1 is a simplified diagrammatical view of a prior art optical playback system for video disc recordings.

The same numerals will be used in the several views to represent the same element.

As shown in the drawings for purposes of illustration, the present invention is concerned with a servo control system for maintaining a beam as nearly as possible in alignment with the center of a recording track on a video recording disc. In the optical system of video reproduction with which the present invention is principally concerned, video information is stored on a disc in the form of raised bumps and flat lands on the disc surface, and is read by means of a light beam scanned across the surface. The bumps exhibit a lower total light reflectivity than the flat areas between the bumps. Moreover, since the scanning beam has a width comparable to the bump width, the reflectivity signal obtained when the beam is scanned over a series of the bumps is substantially sinusoidal in nature. Information is encoded on the disc by forming a large number of bumps in a spiral track on the disc surface. The reflected signal has the form of a sinusoidal carrier, frequency modulated by the composite video information.

Since most discs have eccentricities, some means is provided for maintaining the reading beam centered on the information track as closely as possible. When only a single reading beam is utilized both for obtaining information recorded on the track and for obtaining an error signal for centering the beam, a radial oscillatory motion, usually referred to as a dither, is applied to the beam in order to determine in which direction a correction signal should be applied to keep the beam centered on the track. As set forth in the aforementioned copending patent application, an error signal can be obtained by switching from an intermediate signal to the inverted intermediate signal according to the polarity of the dither signal.

As shown in FIG. 1, in a typical optical playback assembly a laser light source, indicated by reference number 1, directs light onto a disc surface 2. The reading beam from the laser is first reflected by a plane mirror 3, and then focused by a lens 4 onto a beam splitting prism 5, the transmitted portion of the beam, indicated at 6, then being directed through a quarter-wave plate 7, and thence reflected from two successive fixed mirrors 8 and 9, and then from a movable mirror 10, which is pivotally mounted as shown at 11, and is adjustable in angle by means of a transducer 12. Finally the beam is passed through an objective lens system 13, and focused on the disc 2. A beam reflected from the disc follows essentially the same path back to the beam splitting prism 5, at which point the reflected beam is further reflected by the prism to a light detector 14.

The detector 14 is a photoelectric transducer from which an output signal is transmitted to video signal processing circuity, as indicated at 15, and to a beam position servo mechanism, over line 16. Typically, the read beam is made to follow the spiral track by translating the entire optical playback assembly radially across the disc at a constant speed, with corrections for eccentricity and other tracking errors being made by means of the mirror positioning transducer 12, in accordance with a control signal supplied over line 17. The optical playback assembly may be supported at a constant distance above the disc by an air bearing, as indicated at 18.

The prior art teaches that an error signal is derived from the intermediate signal and the polarity of the dither signal, and is applied to the beam positioning transducer in combination with the dither signal. The manner in which the dither signal and the intermediate signal are combined will now be explained in detail with reference to FIG. 2.

Figure 2:
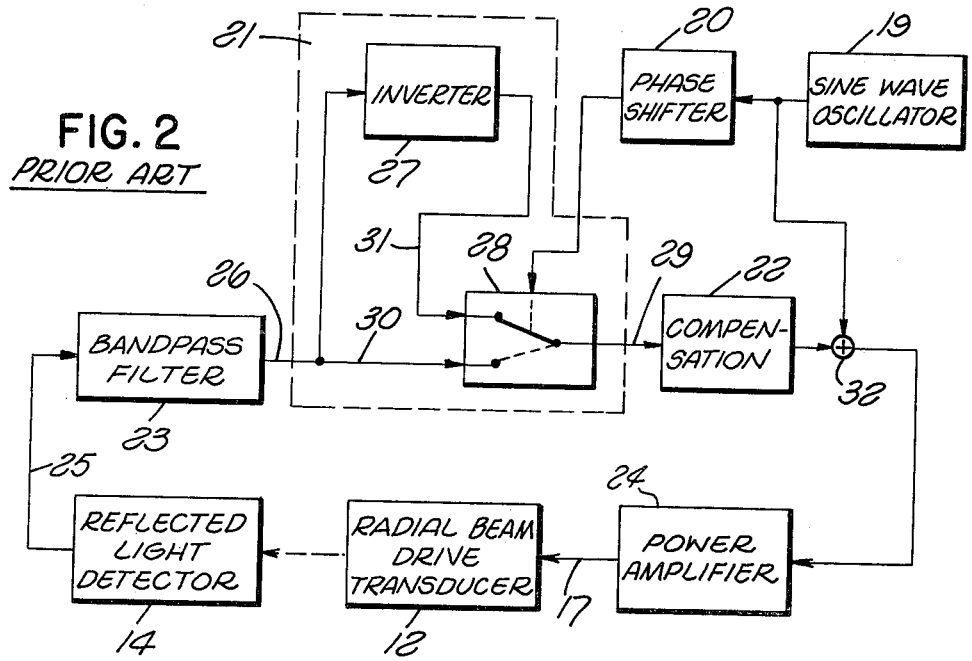
FIG. 2 is a block diagram of a beam position servo control system in a prior art video disc system.

As shown in FIG. 2, the beam positioning servo circuit comprises a sine wave oscillator 19 for generating the dither signal, a phase shifter 20, a switching multiplier 21, a compensation network 22, a bandpass filter 23, and a power amplifier 24. An output signal from the circuit is obtained from the power amplifier and supplied over the line 17 to the beam positioning transducer 12. The light reflectivity signal is derived from the reflected light detector 14, over a line 25 to the bandpass filter 23. The bandpass filter 23 performs the filtering functions necessary to obtain the intermediate signal, which is then transmitted over a line 26 to the switching multiplier 21.

The switching multiplier 21 comprises an inverter 27 and a switch 28. The filtered signal from the bandpass filter 23 is connected both to the inverter 27 and to one pole of the switch 28, and the signal from the inverter 27 is connected to the other pole of the switch 28. In operation, the switch 28 selects one or the other of the input signals, i.e., either the inverted or the non-inverted signal from the bandpass filter 23. A dither signal from the sine wave oscillator 19 is passed through the phase shifter 20, which compensates for phase shifts introduced in portions of the circuit between the oscillator 19 and the switch 28. As will be further explained, the dither signal is then used to control the position of the switch 28 in such a manner that the output of the switching multiplier on line 29 to the compensation circuit 22 comprises either the inverted or the non-inverted signal from the bandpass filter 23. Basically, the switch 28 is responsive to the instantaneous polarity of the dither signal, i.e., when the dither signal is positive, the non-inverted intermediate signal on line 30 from the filter 23 is selected, and when the dither signal is negative, the inverted signal on line 31 from the inverter 27 is selected.

When the beam is on the righthand side of a track, the intermediate signal is always in phase with the dither signal and the resulting error signal consists of only positive excursions. On the other hand, when the beam is on the lefthand side of a track, the intermediate signal is out of phase with the dither signal, and only negative excursions of the error signal result.

The resulting error signal is next low-pass filtered in the compensation network 22 to produce essentially a sine-wave-shaped error signal, ninety degrees out of phase with the reflected signal. This error signal is combined with the dither signal in a summing circuit 32 and is applied to the power amplifier 24. The output of the amplifier 24 is applied to the beam positioning transducer 12.

This prior art teaches a satisfactory means of manipulating a beam of light to follow an information track, if not for the provision of only one beam steering device with its aforementioned problems.

FIGS. 3A and 3B illustrate the preferred embodiment of the present invention.

A laser 33, provides a coherent beam of light 33' which is directed to the information surface 2A of a videodisc 2. The reading beam 33' is manipulated by a series of plane mirrors 34 and 35. The plane mirrors 34 and 35 direct the read beam 33' to pass through a diverging lens 36. The diverging lens 36 acts to enlarge the area of the reading beam 33'. The beam 33', then passes through a beam splitter 37. The beam splitter 37, is polarization sensitive, allowing only one polarization of light to pass through the beam splitter 37. The beam 33' then passes to a second lens 38. The diverging lens 36 and the second lens 38 cooperate to form a light beam collimator. The collimator functions to eliminate aberrations which could be introduced by subsequent elements in the optical path. The beam 33' then passes to a quarterwave plate 39, which changes the polarization of the reading beam 33' by 45°. The reorientation of the polarization of the reading beam 33' eliminates interference between the reading beam 33' and a reflected beam 33" from the videodisc 2. The quarter wave plate 39, further provides that the reflected beam 33" is reflected from the beam splitter 37 to a photodetector 40. The beam 33' then passes to a piezoelectric dither element 41. The piezoelectric element 41, provides a dither signal to the read beam 33'. The application of the dither signal to the piezoelectric element 41 and subsequently to the read beam 33' will be discussed in detail with reference to a subsequent figure. The beam 33' is then directed to a third plane mirror 42 which directs the read beam 33' to impinge upon a movable mirror 43. The movable mirror 43, manipulates the beam 33' to follow the information track in response to control signals generated by a tracking servo shown in FIG. 6. The beam 33' then passes to a fourth plane mirror 44, which directs the beam 33' to an objective lens 45. The objective lens 45 images the beam 33' upon the information surface 2A of the videodisc 2.

FIG. 3B illustrates the relationship of the movable mirror 43, the fourth plane mirror 44, and the objective lens 45.

The videodisc 2 is provided with a reflective layer 2b which reflects the reading beam 33' and forms the reflected beam 33". The reflected beam 33" retraces the path of the reading beam 33' back to the beam splitter 37. At the beam splitter 37, the reflected beam 33" is directed to the photodetector 40. The photodetector 40 is a photoelectric transducer from which an output signal is transmitted to the tracking servo over a line 67.

Referring now to FIG. 4A which illustrates a detailed schematic view of the piezoelectric dither element 41.

The piezoelectric dither element 41 includes a piezoelectric crystal 42. A first resistive film 44 is applied to a first surface 46 of the crystal 42. A second resistive film 45 is applied to a second opposing surface 47 of the piezoelectric crystal 42. A first contact electrode 48a is attached along an edge 49 of the resistive film 44. A second contact electrode 48b is attached along a second edge 50 of the resistive film 44. The second electrode 48b is positioned parallel to the first electrode 48a. Since the read beam 33' passes through the crystal 41 through the surfaces, the thin resistive films 44 and 45 are highly transmissive at the wave length of the reading beam 33' and the reflective beam 33".

Tin oxide is a suitable resistive material having both the proper optical transmissiveness and a suitable resistivity. Tin oxide, however, requires special techniques for application to an optical element. This process is called NESA coating and is discussed in detail in an article by B. H. Billings in Volume 39 of the *Journal of the Optical Society of America* Page 802. Another suitable material for forming the resistive films 44 and 45 is manufactured by Optical and Conductive Coatings of Pacheco, Calif. as Type OCC-3 material.

The piezoelectric element 42 of the preferred embodiment is a single crystal structure. Quartz or lithium niobate are suitable piezoelectric crystals. However, a poly-crystalline piezoelectric element would serve as well as the single crystal structure.

A suitable material for use as the contact electrodes 48a and 48b is gold.

When electrical charges are applied by external means to the faces 46 and 47 of the crystal, the crystal exhibits strain, i.e., dimensions of the crystal change. When the direction of the applied electrical field is reversed, the direction of the resulting strain is reversed. If an alternating field is applied to the crystal, it can be made to vibrate at a frequency determined by the dimensions of the crystal. Further, the strain or change in dimensions of the crystal is directly proportional to the electrical field intensity applied to the crystal.

The resistive films 44 and 45 provide a linear electrical field gradient across the face 46 of the crystal 42 causing the piezoelectric dither element 41 to deform asymmetrically as shown in FIG. 4B. Thus imparting a greater lateral change to the reading beam 33' than a normally deformed piezoelectric element.

The application of the electrical voltages are varied by alternating between the contact electrodes 48a and 48b causing the piezoelectric element 41 to alternate its deformation. This causes the read beam 33' to be moved laterally with respect to the information track at the frequency of the piezoelectric dither elements changing dimension.

Figure 5:
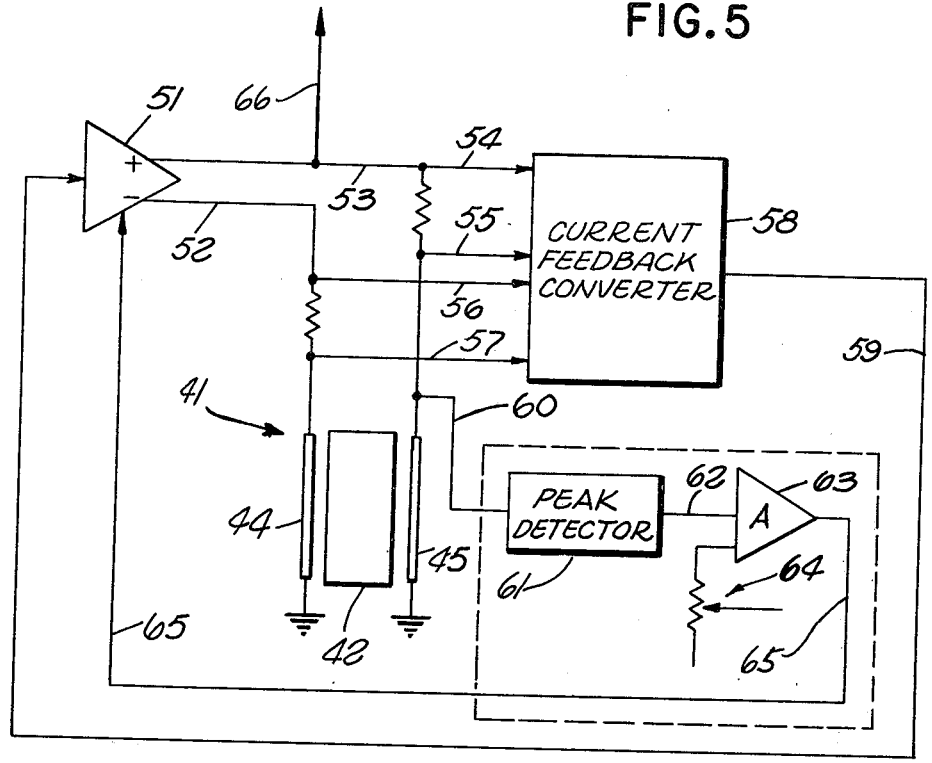
FIG. 5 is a block diagram of an oscillatory dither signal generator.

FIG. 5 is a schematic representation of the dither signal generator.

An amplifier 51 provides a sine wave output on the lines 52 and 53. The output 52 and 53 are the dither drive signals provided to the piezoelectric dither element 41.

The current provided to the resistive films 44 and 45, shown in FIG. 4A, is further directed to a current feedback converter 58 along the lines 54, 55, 56 and 57. The current feedback converter 58 generates a voltage proportional to the current passing through the piezoelectric element 42. The voltage generated in the current feedback converter 58 is then applied to the amplifier 51 along the line 59. This system provides a feedback signal to the amplifier 51 for maintaining the oscillations of the piezoelectric dither element 41, at the desired frequency.

Further, a line 60 provides the dither signal which is applied to the piezoelectric crystal 42 to a peak detector 61. The peak detector measures the amplitude of the dither signal, which is then applied over the line 62 to an amplifier 63. The amplifier 63 has a second input from a potentiometer 64 which provides an adjustable output 65 of the amplifier 63. The adjustable output 65 is then directed to the amplifier 51.

This circuitry provides precise control of the dither amplitude. Such precise control of the dither amplitude further provides accurate control of the amplitude of the dither signal applied to the read beam 33. This precision is required due to the minute size of the actual information stored on the information storage medium.

The line 66 provides the dither signal to the tracking servo for phase comparison, which will be discussed in detail in a later figure.

Figure 6:
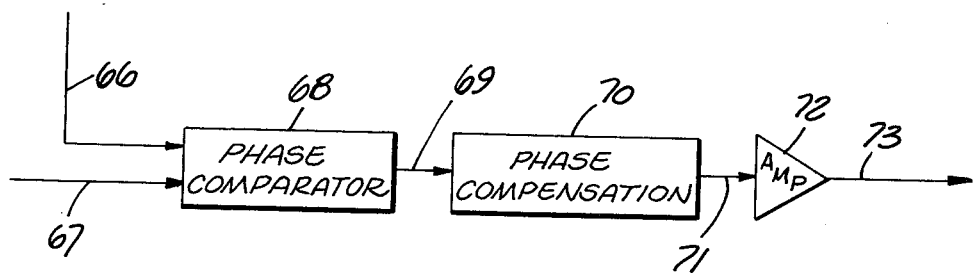
FIG. 6 is a block diagram of a beam position servo control circuit.

FIG. 6 shows a schematic representation of the tracking servo.

The dither signal on the line 66 and the information retrieved from the video disc 2 on the line 67 are applied to a phase comparator 68. The phase comparator 68 compares the actual dither signal applied to the piezoelectric dither element 41 and the retrieved dither signal from the video disc 2.

The phase and amplitude errors determined by the phase comparator 68 indicate the direction and amount of the actual tracking error.

The tracking error signal is then directed to a phase compensation network 70 along a line 69. The phase compensation network corrects for unwanted phase shifts which might occur in the dither tracking system. The phase corrected signal is then transmitted along a line 71 to an amplifier 72. A tracking mirror control signal is generated in the amplifier 72 and directed along a line 73 to the tracking mirror 43.

The tracking mirror control signal provides impulses to the tracking mirror 43, which represent the direction and amount of the tracking correction required to maintain the reading beam 33' aligned about the center of the track throughout its radial excursions.

Figure 7:
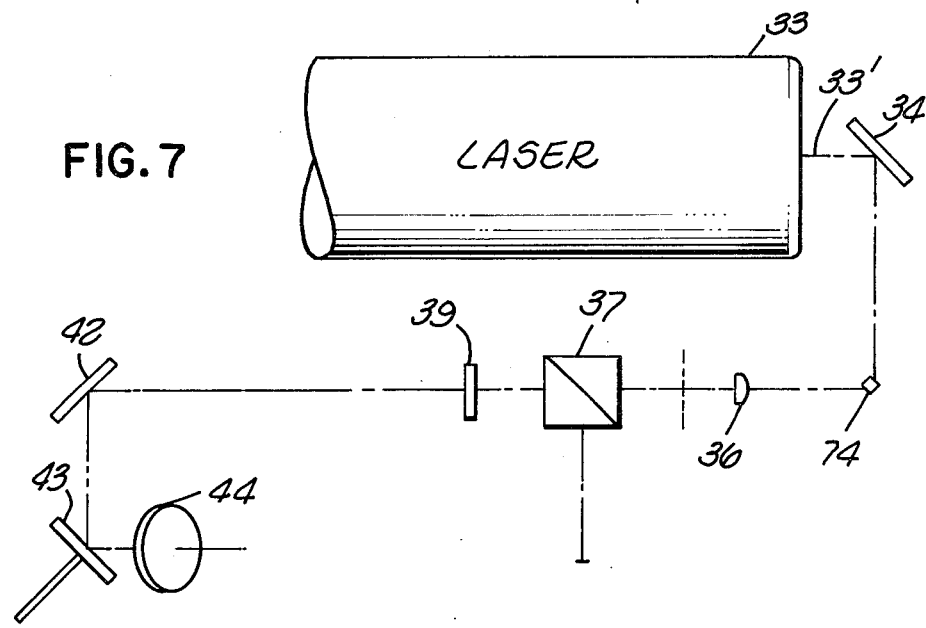
FIG. 7 is a simplified diagrammatical view of an optical playback system for video disc recordings according to an alternative embodiment of the present invention.

Now referring to FIG. 3A and FIG. 7 jointly. In the embodiment illustrated in FIG. 7, all elements which were earlier described in FIG. 3A function identically as their counterparts in FIG. 3A. However, the plane mirror 35 shown in FIG. 3A is replaced by a piezoelectric dither element 74 as shown in FIG. 7. Further, the second lens 38 and the piezoelectric dither element 41 are omitted from this embodiment.

The piezoelectric dither element 74 serves the same purpose as the piezoelectric dither element 41 shown in FIG. 3A, although it achieves the application of the dither signal to the light beam in a different manner.

Figure 8A:
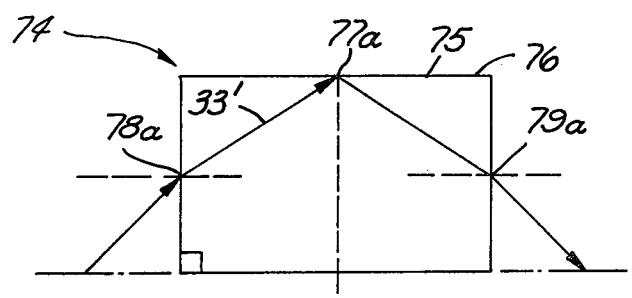
FIG. 8A is a detailed drawing of the piezoelectric dither member for use in the system shown in FIG. 7.
Figure 8B:
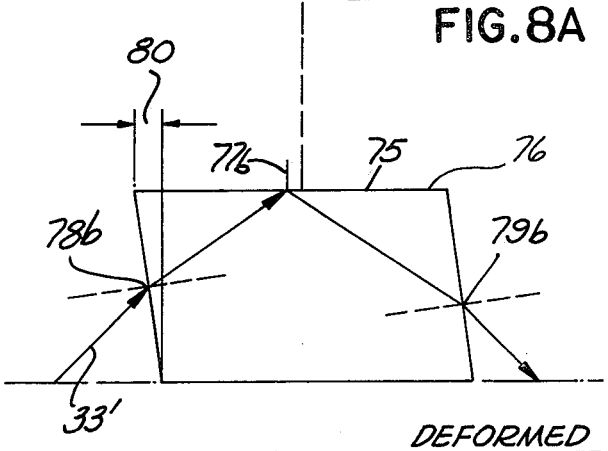
FIG. 8B is a detailed illustration of the piezoelectric dither member of FIG. 8A in its deformed state.

FIG. 8A illustrates how the piezoelectric dither element 74 acts to produce a dither on the light beam 33'. The piezoelectric dither element 74 is coated on the surface 75 with a reflective layer 76. The reflective layer 76 reflects the light beam 33' at the point 77a from its entry point 78a to the light beam exit point 79a. When the piezoelectric dither element 74 is deformed as shown in FIG. 8B, the light beam 33' now strikes the entry point 78b at a different incident angle. The different incident angle 80 manipulates the light beam 33' to strike the reflective layer 76 at a reflection point 77b. The light beam 33' is then directed to its new exit point 79b.

The application of a dither signal to the piezoelectric element 74 would thus cause the beam 33' to be deflected at the frequency of the dither signal.

Referring back to FIG. 7. The optical system shown in FIG. 7, when compared to the embodiment shown in FIG. 3A, appears simpler in a number of elements. This is in fact true, however, the piezoelectric element 74 of FIG. 7 is more sensitive to optical misalignment.

This embodiment will operate effectively with the circuitry described with reference to FIGS. 5 and 6.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for retrieving information stored in a plurality of optically readable information tracks formed in an information storage medium, said apparatus comprising:

a light source for producing a reading beam of light radiation;

optical means for defining an optical path between said light source and the information tracks carried by the storage medium, and said optical means including at least a radial tracking mirror, a piezoelectric dither structure, and a beam splitting means;

said radial tracking mirror being employed for moving said reading beam in a radial direction with respect to said information track;

said reading beam being modulated by and reflected by said information track to retrace at least a portion of said path;

sensing means for receiving said reflected beam of radiation from said information track;

said beam splitting means being positioned along said portion of said path common to said reading beam and said reflected beam for directing said reflected beam out of the path of said reading beam and toward said sensing means;

oscillator apparatus for generating a periodic electrical drive signal;

said piezoelectric structure having at least a first surface and a second surface, a first transmissive resistive film formed over said first surface, a second transmissive resistive film formed over said second surface, at least first and second spaced electrodes attached to said first resistive film;

said read beam impinges upon said first resistive film intermediate said first and second electrodes, and said read beam passes through said crystal and said first and second resistive films;

said first and second electrodes being responsive to said electrical drive signal from said oscillator apparatus for creating a linear electrical field gradient across one surface of said crystal which deforms said crystal asymmetrically in a radial direction relative to the information track to cause the read beam to deflect laterally across the information track;

tracking servo means responsive both to the output of said oscillator apparatus and to the output of said sensing means for comparing the phase relationship between said dither signal generated by said oscillator and said dither signal as reflected from said disc and detected by said sensing means and for generating a tracking error signal; and said tracking error signal being applied to said tracking mirror for maintaining the reading beam aligned about the center of the track throughout its radial excursions.

2. The dither apparatus as recited in claim 1, wherein said piezoelectric crystal is quartz.

3. The dither apparatus as recited in claim 1, wherein said piezoelectric crystal is lithium niobate.

4. The dither apparatus as recited in claim 1, wherein said first and second resistive films are formed of a layer of tin oxide.

5. The dither apparatus as recited in claim 1, wherein said first and second electrode members are formed of gold.

* * * * *